(12) United States Patent
Müller et al.

(10) Patent No.: US 10,364,323 B2
(45) Date of Patent: Jul. 30, 2019

(54) METHOD FOR PRODUCING POLYETHER CARBONATE POLYOLS

(71) Applicant: Covestro Deutschland AG, Leverkusen (DE)

(72) Inventors: Thomas Ernst Müller, Aachen (DE); Christoph Gürtler, Köln (DE); Michael Pohl, Aachen (DE); Muhammad Afzal Subhani, Aachen (DE); Walter Leitner, Aachen (DE)

(73) Assignee: Covestro Deutschland AG, Leverkusen (DE)

( * ) Notice: Subject to any disclaimer, the term of this patent is extended or adjusted under 35 U.S.C. 154(b) by 81 days.

(21) Appl. No.: 15/573,940

(22) PCT Filed: May 24, 2016

(86) PCT No.: PCT/EP2016/061674
§ 371 (c)(1),
(2) Date: Nov. 14, 2017

(87) PCT Pub. No.: WO2016/188991
PCT Pub. Date: Dec. 1, 2016

(65) Prior Publication Data
US 2018/0291148 A1    Oct. 11, 2018

(30) Foreign Application Priority Data

May 26, 2015    (EP) .................................... 15169253

(51) Int. Cl.
*C08G 64/34* (2006.01)
*C08G 65/26* (2006.01)

(52) U.S. Cl.
CPC ......... *C08G 64/34* (2013.01); *C08G 65/2603* (2013.01); *C08G 65/2615* (2013.01); *C08G 65/2663* (2013.01)

(58) Field of Classification Search
CPC . C08G 64/34; C08G 65/2615; C08G 65/2663
See application file for complete search history.

(56) References Cited

U.S. PATENT DOCUMENTS

| 3,404,109 | A  | 10/1968 | Milgrom |
| 3,829,505 | A  | 8/1974  | Herold |
| 3,941,849 | A  | 3/1976  | Herold |
| 5,158,922 | A  | 10/1992 | Hinney et al. |
| 5,470,813 | A  | 11/1995 | Le-Khac |
| 5,482,908 | A  | 1/1996  | Le-Khac |
| 5,536,883 | A  | 7/1996  | Le-Khac |
| 5,545,601 | A  | 8/1996  | Le-Khac |
| 5,627,120 | A  | 5/1997  | Le-Khac |
| 5,637,673 | A  | 6/1997  | Le-Khac |
| 5,712,216 | A  | 1/1998  | Le-Khac et al. |
| 5,714,428 | A  | 2/1998  | Le-Khac |
| 5,789,626 | A  | 8/1998  | Le-Khac |
| 6,018,017 | A  | 1/2000  | Le-Khac |
| 6,780,813 | B1 | 8/2004  | Hofmann et al. |
| 6,835,687 | B2 | 12/2004 | Hofmann et al. |
| 7,008,900 | B1 | 3/2006  | Hofmann et al. |
| 8,324,419 | B2 | 12/2012 | Mijolovic et al. |
| 9,273,183 | B2 | 3/2016  | Muller et al. |
| 2003/0158449 | A1 | 8/2003 | Hofmann et al. |
| 2005/0027145 | A1 | 2/2005 | Hofmann et al. |
| 2006/0089252 | A1 | 4/2006 | Coates et al. |
| 2008/0265206 | A1 | 10/2008 | Kesseler et al. |
| 2010/0048935 | A1 | 2/2010 | Mijolovic et al. |
| 2012/0165549 | A1 | 6/2012 | Ok et al. |
| 2013/0059973 | A1* | 3/2013 | Wamprecht ............ C08G 18/10 524/590 |
| 2015/0225503 | A1 | 8/2015 | Muller et al. |

FOREIGN PATENT DOCUMENTS

JP          04145123 A    5/1992

OTHER PUBLICATIONS

Inoue, S. et al.; "Copolymerization of Carbon Dioxide and Epoxide with Organometallic Compounds"; Die Makromolekulare Chemie 130, pp. 210-220, (1969); Tokyo, Japan.

Kobayashi, M. et al.; "Nitrilase of Rhodococcus rhodochrous J1 Purification and characterization"; Eur. J. Biochem.; 182; pp. 349-356; (1989); Department of Agricultural Chemistry, Faculty of Agriculture, Kyoto University.

Mussini, T. et al.; "Criteria for Standardization of pH Measurements in Organic Solvents and Water + Organic Solvent Mixtures of Moderate to High Permittivities"; Pure & Appl. Chem.; vol. 57; No. 6, pp. 865-876; (1985); Department of Physical Chemistry and Electrochemistry, University of Milano, Italy and Department of Physical Ohemistry, the University, Newcastle-upon-Tyn NE1 7RU, United Kingdom.

(Continued)

*Primary Examiner* — Kuo Liang Peng
(74) *Attorney, Agent, or Firm* — N. Denise Brown

(57) ABSTRACT

The invention relates to a method for producing polyether carbonate polyols by agglomeration of alkyl oxides and carbon dioxide on carboxylic acid in the presence of a double metal cyanide (DMC) catalyst, wherein one or more carboxylic acids are continually added to the reactor during the reaction, characterized in that the carboxylic acid is at least difunctional and has a pKa value greater than or equal to 1.5, and the adding of the one or more carboxylic acids occurs such that, at any time in the method according to the invention, the molar concentration of unconverted carboxylic acid in the reaction mixture does not exceed a value in the amount of 0.001 mol/g multiplied by the mass of the catalyst used per liter of reaction mixture, specified in grams, and two carboxylic acid groups present in the same molecule are separated from each other at least by one carbon atom. The method further relates to the polyether carbonate polyols obtained according to the invention.

14 Claims, No Drawings

(56) References Cited

OTHER PUBLICATIONS

Chilsolm, M. H. et al.; Macromolecules; 35 (17), pp. 6494-6504; (2002); Department of Chemistry, The Ohio State University, Columbus, Ohio; Abstract Attached.

Allen, S. D. et al.; "High-Activity, Single-Site Catalysts for the alternating Copolymerization of $CO_2$ and Propylene Oxide", J. Am. Chem. Soc.; (2002); 124 (48); pp. 14284-14285; Department of Chemistry and Chemical Biology, Baker Laboratory, Cornell University, Ithaca, New York.

Kember, M. R. et al., "Highly Active Dizine Catalyst for the Copolymerization of Carbon Dioxide and Cyclohexene Oxide at One Atmosphere Pressure**"; Agnew. Chem. Int. Ed.; 48; pp. 931-933; (2009); Wiley-VCH Verlag GmbH & Co. KGaA, Weinheim, Germany.

\* cited by examiner

METHOD FOR PRODUCING POLYETHER CARBONATE POLYOLS

CROSS-REFERENCE TO RELATED APPLICATIONS

This Application is a National Phase Application of PCT/EP2016/061674, filed May 24, 2016, which claims priority to European Application No. 15169253.0, filed May 26, 2015, each of which being incorporated herein by reference.

FIELD

The present invention relates to a process for preparing polyether carbonate polyols from carboxylic acids as starter compounds, one or more alkylene oxides and carbon dioxide in the presence of a double metal cyanide (DMC) catalyst. It further relates to polyether carbonate polyols obtained by the process according to the invention.

BACKGROUND

The preparation of polyether carbonate polyols by catalytic reaction of alkylene oxides (epoxides) and carbon dioxide in the presence of H-functional starter substances ("starters") has been the subject of intensive study for more than 40 years (e.g. Inoue et al., Copolymerization of Carbon Dioxide and Epoxide with Organometallic Compounds; Die Makromolekulare Chemie 130, 210-220, 1969). This reaction is shown in schematic form hereinbelow, where R is an organic radical such as alkyl, alkylaryl or aryl, each of which may also contain heteroatoms, for example O, S, Si etc., and where e, f and g are integers, and where the product shown here in the scheme for the polyether carbonate polyol should merely be understood such that blocks having the structure shown may in principle be present in the polyether carbonate polyol obtained, but the sequence, number and length of the blocks and OH functionality of the starter can vary, and is not limited to the polyether carbonate polyol shown in the scheme. This reaction is environmentally very advantageous since this reaction constitutes the conversion of a greenhouse gas such as $CO_2$ to a polymer. A further product, actually a by-product, formed is the cyclic carbonate shown in the scheme (for example, when $R=CH_3$, propylene carbonate).

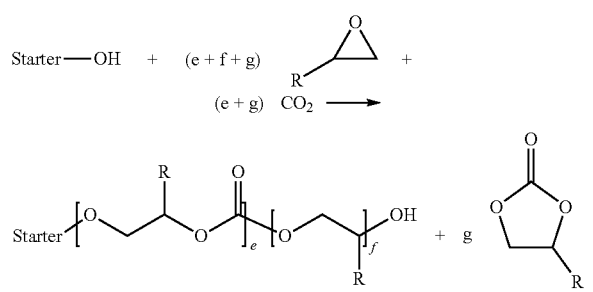

To further increase the sustainability of the obtained polyether carbonate polyols it would be desirable to make H-functional starter substances ("starters") not based on fossil raw materials available for the process. A substance class readily accessible from natural products are carboxylic acids. For example, malic acid, succinic acid, lactic acid and citric acid are readily accessible by fermentation. A process for enzymatic preparation of 5-norbornene-2-carboxylic acid is described in Eur. J. Biochem. 182, 349-356, 1989. A fermentative process for preparing 5-norbornene-2-carboxylic acid is described in WO 2007071578 A2. Readily accessible natural products further include amino acids which likewise contain a carboxylic acid group.

Double metal cyanide compounds are particularly suitable as catalysts for preparing polyether carbonate polyols by catalytic reaction of alkylene oxides (epoxides) and carbon dioxide in the presence of H-functional starter substances ("starters").

WO-A 2008/092767 discloses a process for preparing polyether carbonate polyols, characterized in that one or more H-functional starter substances are initially charged in the reactor and in that one or more H-functional starter substances are metered continuously into the reactor during the reaction. Recited alkoxylation-active groups having active H atoms also include $CO_2H$.

EP 2703425 A1 discloses a process for preparing polyether carbonate polyols by addition of alkylene oxides and carbon dioxide onto one or more H-functional starter substance(s) in the presence of a double metal cyanide catalyst, characterized in that a suspension medium containing no H-functional groups is initially charged in a reactor and one or more H-functional starter substance(s) are metered continuously into the reactor during the reaction. Disclosed monofunctional starter substances also include carboxylic acids (monofunctional carboxylic acids such as formic acid, acetic acid, propionic acid, butyric acid and fatty acids such as stearic acid, palmitic acid, oleic acid, linoleic acid, linolenic acid and also benzoic acid and acrylic acid).

Double metal cyanide catalysts suitable for catalytic reaction of alkylene oxides (epoxides) and carbon dioxide are characterized by a certain basicity. None of the abovementioned documents disclose how upon addition of carboxylic acid a neutralization of the basicity and a reduced activity/a deactivation of the employed DMC catalyst may be avoided.

SUMMARY

It was therefore an object of the present invention to provide a process for preparing polyether carbonate polyols in which carboxylic acids are employed as H-functional starter substances and wherein the process results in a product that results in a high content of incorporated $CO_2$ in the resulting polyether carbonate polyol.

It has been found that, surprisingly, the object of the invention is achieved by a process for preparing polyether carbonate polyols by addition of alkylene oxides and carbon dioxide onto carboxylic acids in the presence of a double metal cyanide (DMC) catalyst, wherein one or more carboxylic acids are metered into the reactor continuously during the reaction, characterized in that

- the carboxylic acid is at least difunctional and has a with a pKa of not less than 1.5,
- the addition of the one or more carboxylic acids is effected such that at any point in time in the process according to the invention the molar concentration of unconverted carboxylic acid in the reaction mixture does not exceed a value of 0.001 mol/g multiplied by the mass of the catalyst employed per liter of reaction mixture reported in grams, and
- two carboxylic acid groups present in the same molecule are separated from one another at least by a carbon atom.

DETAILED DESCRIPTION

During a continuous metered addition of the carboxylic acid according to the process according to the invention the double metal cyanide catalyst is inhibited or deactivated by the employed carboxylic acid only to a small extent, if at all. The obtained polyether carbonate polyols exhibit a high content of incorporated $CO_2$. The molecular weight of the obtained polyether carbonate polyol corresponds to the sum product of the molar amounts of converted reactants and the molecular weight thereof divided by the molar amount of the carboxylic acid employed as H-functional starter substances. The obtained polyether carbonate polyols exhibit a narrow molecular weight distribution.

Without wishing to be tied to a particular theory, the concentration of unconverted carboxylic acid results from the metering rate of the carboxylic acid and the conversion rate of carboxylic acid into the carboxylic ester. The molar concentration of unconverted carboxylic acid in the reaction mixture may be determined by in situ IR spectroscopy for example. In the IR spectrum carboxylic acids exhibit a characteristic band (A) at 1710 $cm^{-1}$ and epoxides exhibit a characteristic band (B) at 820 $cm^{-1}$. It has proven advantageous when the addition of the carboxylic acid is effected such that at every point in time of the process according to the invention the ratio of the intensity of the two bands AB is less than 1, preferably less than 0.1 and very particularly preferably less than 0.01, where A is the intensity of the band at a wavenumber of 1710±10 $cm^{-1}$ and B is the intensity of the band at a wavenumber of 820±10 $cm^{-1}$. The intensity of the bands is here calculated on the basis of a spectrum where the background is subtracted. The analysis of the bands of the spectrum may be effected using the software Peaxact for example. At these values of A/B advantageous ratios between the metering rate of the carboxylic acid and the conversion rate of carboxylic acid are present.

The process according to the invention includes a feature that the molar concentration of unconverted carboxylic acid in the reaction mixture does not exceed a particular threshold value based on the employed concentration of the catalyst. A maximum value for the molar concentration of unconverted carboxylic acid in the reaction mixture of 0.001 mol/g, preferably of 0.0005 mol/g and particularly preferably of 0.0001 mol/g multiplied by the mass of the catalyst employed per liter of reaction mixture reported in grams has proven advantageous. At a molar concentration of unconverted carboxylic acid in the reaction mixture below the threshold value the metering rate of the carboxylic acid may be increased. When the concentration of unconverted carboxylic acid in the reaction mixture increases the metering rate of the carboxylic acid is reduced. A metering rate for the carboxylic acid of ≤10 mol·$(g_{DMC} \cdot h)^{-1}$, preferably of ≤1 mol·$(g_{DMC} \cdot h)^{-1}$, and particularly preferably of ≤0.1 mol·$(g_{DMC} \cdot h)^{-1}$ based on the mass of the DMC catalyst employed in the reaction mixture has proven advantageous.

A preferred embodiment of the invention relates to a process for preparing polyether carbonate polyols by addition of alkylene oxides and carbon dioxide onto carboxylic acids in the presence of a double metal cyanide (DMC) catalyst, characterized in that (α) a suspension medium containing no H-functional groups and selected from one or more compound(s) of the group consisting of aliphatic lactones, aromatic lactones, lactides, cyclic carbonates having at least three optionally substituted methylene groups between the oxygen atoms of the carbonate group, aliphatic cyclic anhydrides and aromatic cyclic anhydrides is initially charged in a reactor, (β) optionally, to the mixture from step (α), a portion of alkylene oxide is added at temperatures of 90 to 150° C., and wherein the addition of the alkylene oxide compound is then interrupted, and (γ) one or more carboxylic acids are metered into the reactor continuously during the reaction, wherein
the carboxylic acid is at least difunctional and has a with a pKa of not less than 1.5,
the addition of the one or more carboxylic acids is effected such that at any point in time in the process according to the invention the molar concentration of unconverted carboxylic acid in the reaction mixture does not exceed a value of 0.001 mol/g multiplied by the mass of the catalyst employed per liter of reaction mixture reported in grams, and
two carboxylic acid groups present in the same molecule are separated from one another at least by a carbon atom.

Employed as carboxylic acids according to the invention are one or more compounds having a functionality of at least 2, preferably of 2 to 8, particularly preferably of 2 to 6 and very particularly preferably of 2 to 4. These compounds contain in addition to the carboxylic acid group at least one further chemical group having at least one Zerewitinoff-active H atom. Chemical groups having at least one Zerewitinoff-active H atom are preferably $CO_2H$, OH, NHR and $NH_2$. For example in the context of the invention a carboxylic acid having a functionality of 2 is to be understood as meaning a compound containing either two carboxylic acid groups or a carboxylic acid group and a Zerewitinoff-active group selected from the group consisting of hydroxyl group and secondary amine group. The polyether carbonate polyols are obtained by catalytic addition of carbon dioxide and alkylene oxides onto the carboxylic acid group and the further Zerewitinoff-active H atoms. The functionality of the carboxylic acid, i.e. the number of the Zerewitinoff-active groups (i.e. for the alkoxylation-active H-atoms) per carboxylic acid molecule, determines the functionality, i.e. the average number of terminal hydroxyl groups per molecule of polyether carbonate polyol. The carboxylic acid group, hydroxyl groups and secondary amine groups act as one Zerewitinoff-active group, primary amine groups as two Zerewitinoff-active groups.

As the carboxylic acid at least one compound of formula RR'R"C—COOH is employed, wherein
R represents an optionally heteroatom-substituted hydroxyalkyl, hydroxyalkenyl, hydroxyaryl, carboxyalkyl, carboxyalkenyl or carboxyaryl radical or an OH, COOH, $NH_2$ or NHR''' group, wherein R''' represents an alkyl, alkenyl or aryl radical and
R' and R" independently of one another represent hydrogen or an optionally heteroatom-substituted alkyl, alkenyl, aryl, hydroxyalkyl, hydroxyalkenyl, hydroxyaryl, carboxyalkyl, carboxyalkenyl or carboxyaryl radical.

Two carboxylic acid groups present in the same molecule are separated from one another at least by a carbon atom. Without wishing to be tied to a particular theory polycarboxylic acids having a certain distance between neighboring carboxylic acid groups do not result, or result in a less distinct, inhibition or deactivation of the employed double metal cyanide catalyst.

Carboxylic acids suitable for the process according to the invention have a pKa of not less than 1.5, preferably not less than 1.7 and particularly preferably not less than 3.0. The pKa in the context of the process according to the invention is to be understood as meaning the negative decadic logarithm of the first dissociation constant of the carboxylic acid at a temperature of 25 degrees Celsius. Without wishing to be tied to a particular theory, weakly acidic carboxylic acids do not result, or result in a less distinct, inhibition or deactivation of the employed double metal cyanide catalyst. The pKa of the carboxylic acid may be measured by determining the pH at the half-equivalence point. To this end, an aqueous solution of the carboxylic acid is titrated against sodium hydroxide solution of a defined concentration and in each case the pH of the solution is measured using a calibrated combination pH electrode. The $1^{st}$ derivative of the titration curve has a first maximum at the half-equivalence point which corresponds to the first dissociation constant. According to the Henderson-Hasselbalch equation at the half-equivalence point the pKa corresponds to the measured pH because the acid and its corresponding base are present in equal concentration. Carboxylic acids having an insufficient solubility in water are titrated in methanolic solution ($pK_{Ly}$=16.7) or ethanolic solution ($pK_{Ly}$=19.1), wherein $pK_{Ly}$ is defined as follows for nonaqueous media.

$$K_{Ly} = \frac{c(HLy^+) * c(A^-)}{c(HA)}$$

$$pK_{Ly} = -\log(K_{Ly})$$

The length of the pH scale results from the $pK_{Ly}$ (cf. water pKa 14), the neutral point at which the lyonium ion and the lyate ion are present in equal concentration is at $$\frac{pK_{Ly}}{2}.$$

A description of methods for determining the pKa may be found, for example, in T. Mussini et al., Pure & Appl. Chem., 1985, Vol. 57, No. 6, pp. 865-876.

Examples of suitable carboxylic acids are compounds selected from the group containing malonic acid, maleic acid, fumaric acid, succinic acid, oxalacetic acid, glutaric acid, adipic acid, pimelic acid, suberic acid, azelaic acid, sebacic acid, glycolic acid, lactic acid, tartronic acid, malic acid, tartaric acid, citric acid, isocitric acid, mandelic acid, gallic acid, γ-hydroxybutyric acid, γ-aminobutyric acid, ricinoleic acid, salicylic acid, hippuric acid, phthalic acid, isophthalic acid, terephthalic acid, shikimic acid, quinic acid, chorismic acid, gluconic acid. Also suitable are amino acids such as alanine, arginine, aspsin, aspartic acid, glutamine, glutamic acid, glycine, histidine, isoleucine, leucine, lysine, methionine, phenylalanine, proline, serine, threonine, tryptophan, tyrosine, valine.

Step (α):

In the process according to the invention, it is possible first to initially charge the reactor with a suspension medium contains. Subsequently, the amount of DMC catalyst required for the polyaddition, preferably in unactivated form, is added to the reactor. The sequence of addition is not crucial. It is also possible to charge the reactor first with the DMC catalyst and then with the suspension medium. Alternatively, it is also possible first to suspend the DMC catalyst in the inert suspension medium and then to introduce the suspension into the reactor. The suspension medium provides an adequate heat exchange area with the reactor wall or cooling elements installed in the reactor, such that the heat of reaction released can be removed very efficiently. Moreover, the suspension medium, in the event of a cooling failure, provides heat capacity, such that the temperature in this case can be kept below the breakdown temperature of the reaction mixture.

The suspension media used in accordance with the invention preferably do not contain any H-functional groups. Suitable suspension media are all polar aprotic, weakly polar aprotic and nonpolar aprotic solvents, none of which contain any H-functional groups. The suspension medium used may also be a mixture of two or more of these suspension media. The following polar aprotic solvents are mentioned here by way of example: 4-methyl-2-oxo-1,3-dioxolane (also referred to hereinafter as cyclic propylene carbonate or cPC), 1,3-dioxolan-2-one (also referred to hereinafter as cyclic ethylene carbonate or cEC), acetone, methyl ethyl ketone, acetonitrile, nitromethane, dimethyl sulfoxide, sulfolane, dimethylformamide, dimethylacetamide and N-methylpyrrolidone. The group of the nonpolar and weakly polar aprotic solvents includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media used are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

Likewise suitable as suspension media used in accordance with the invention are aliphatic lactones, aromatic lactones, lactides, cyclic carbonates having at least three optionally substituted methylene groups between the oxygen atoms of the carbonate group, aliphatic cyclic anhydrides and aromatic cyclic anhydrides.

Aliphatic or aromatic lactones in the context of the invention are cyclic compounds containing an ester bond in the ring, preferably 4-membered lactone rings such as β-propiolactone, β-butyrolactone, β-isovalerolactone, β-caprolactone, β-isocaprolactone, β-methyl-β-valerolactone, 5-membered lactone rings such as γ-butyrolactone, γ-valerolactone, 5-methylfuran-2(3H)-one, 5-methylidenedihydrofuran-2(3H)-one, 5-hydroxyfuran-2(5H)-one, 2-benzofuran-1(3H)-one and 6-methyl-2-benzofuran-1(3H)-one, 6-membered lactone rings such as 1,4-dioxan-2-one, dihydrocumarin, 1H-isochromen-1-one, 8H-pyrano[3,4-b]pyridin-8-one, 1,4-dihydro-3H-isochromen-3-one, 7,8-dihydro-5H-pyrano[4,3-b]pyridin-5-one, 4-methyl-3,4-dihydro-1H-pyrano[3,4-b]pyridin-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H, 3H-benzo[de]isochromen-1-one, 6,7-dimethoxy-1,4-dihydro-3H-isochromen-3-one and 3-phenyl-3,4-dihydro-1H-isochromen-1-one, 7-membered lactone rings such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, higher-membered lactone rings such as (7E)-oxacycloheptadec-7-en-2-one.

Particular preference is given to ε-caprolactone and dihydrocoumarin.

Lactides in the context of the invention are cyclic compounds containing two or more ester bonds in the ring, preferably glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, 3-hexyl-6-methyl-1,4-dioxane-2,5-dione, 3,6-di(but-3-en-1-yl)-1,4-dioxane-2,5-dione (in each case including optically active forms). Particular preference is given to L-lactide.

Cyclic carbonates having at least three optionally substituted methylene groups between the oxygen atoms of the carbonate group are preferably trimethylene carbonate, neopentyl glycol carbonate (5,5-dimethyl-1,3-dioxan-2-one), 2,2,4-trimethylpentane-1,3-diol carbonate, 2,2-dimethylbutane-1,3-diol carbonate, butane-1,3-diol carbonate, 2-m ethylpropane-1,3-diol carbonate, pentane-2,4-diol carbonate, 2-methylbutane-1,3-diol carbonate, TMP monoallyl ether carbonate, pentaerythritol diallyl ether carbonate, 5-(2-hydroxyethyl)-1,3-di oxan-2-one, 5-[2-(benzyloxy)ethyl]-1,3-dioxan-2-one, 4-ethyl-1,3-di oxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one and 5,5-dipropyl-1,3-dioxan-2-one. Particular preference is given to trimethylene carbonate and neopentyl glycol carbonate.

Cyclic anhydrides are preferably succinic anhydride, maleic anhydride, phthalic anhydride, cyclohexane-1,2-dicarboxylic anhydride, diphenic anhydride, tetrahydrophthalic anhydride, methyltetrahydrophthalic anhydride, norbornenedioic anhydride and chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methyl furan-2,5-dione, 3-methyldihydrofuran-2,5-dione, dihydro-2H-pyran-2,6(3H)-dione, 1,4-di oxane-2,6-dione, 2H-pyran-2,4,6(3H,5H)-trione, 3-ethyl dihydrofuran-2,5-dione, 3-methoxy dihydrofuran-2,5-dione, 3-(prop-2-en-1-yl)dihydrofuran-2,5-dione, N-(2,5-dioxotetrahydrofuran-3-yl)formamide and 3 [(2E)-but-2-en-1-yl]dihydrofuran-2,5-dione. Particular preference is given to succinic anhydride, maleic anhydride and phthalic anhydride.

The suspension medium used may also be a mixture of two or more of the suspension media mentioned. Most preferably, the suspension medium used in step (α) is at least one compound selected from the group consisting of 4-methyl-2-oxo-1,3-dioxolane, 1,3-dioxolan-2-one, acetone, methyl ethyl ketone, acetonitrile, nitromethane, dimethyl sulfoxide, sulfolane, dimethylformamide, dimethylacetamide, N-methylpyrrolidone, dioxane, diethyl ether, methyl tert-butyl ether, tetrahydrofuran, ethyl acetate, butyl acetate, pentane, n-hexane, benzene, toluene, xylene, ethylbenzene, chloroform, chlorobenzene, dichlorobenzene, carbon tetrachloride, ε-caprolactone, dihydrocoumarin, trimethylene carbonate, neopentyl glycol carbonate, 3,6-diethyl-1,4-dioxane-2,5-dione, succinic anhydride, maleic anhydride and phthalic anhydride.

The DMC catalyst is preferably used in an amount such that the content of DMC catalyst in the reaction product resulting after step (γ) is 10 to 10 000 ppm, more preferably 20 to 5000 ppm and most preferably 50 to 500 ppm.

In a preferred embodiment, in step (α), inert gas (for example argon or nitrogen), an inert gas/carbon dioxide mixture or carbon dioxide is introduced into the resulting mixture (i) of suspension medium and (ii) DMC catalyst at a temperature of 90° C. to 150° C., more preferably of 100° C. to 140° C., and at the same time a reduced pressure (absolute) of 10 mbar to 800 mbar, more preferably of 50 mbar to 200 mbar, is applied.

In an alternative preferred embodiment, in step (α), the resulting mixture (i) of suspension medium and (ii) DMC catalyst is contacted at least once, preferably three times, at a temperature of 90° C. to 150° C., more preferably of 100° C. to 140° C., with 1.5 bar to 10 bar (absolute), more preferably 3 bar to 6 bar (absolute), of an inert gas (for example argon or nitrogen), an inert gas/carbon dioxide mixture or carbon dioxide and then the positive pressure is reduced in each case to about 1 bar (absolute).

The DMC catalyst can be added in solid form or as a suspension in a suspension medium or in a mixture of at least two suspension media.

In a further preferred embodiment, in step (α), (α-I) suspension medium is initially charged and (α-II) the temperature of the suspension medium is brought to 50 to 200° C., preferably 80 to 160° C., more preferably 100 to 140° C., and/or the pressure in the reactor is lowered to less than 500 mbar, preferably 5 mbar to 100 mbar, in the course of which an inert gas stream (for example argon or nitrogen), an inert gas/carbon dioxide stream or a carbon dioxide stream is optionally passed through the reactor, wherein the double metal cyanide catalyst is added to the suspension medium in step (α-I) or immediately thereafter in step (α-II) contains.

Step (β):

Step (β) serves to activate the DMC catalyst and thus relates to the embodiment of the process according to the invention in the presence of a DMC catalyst. This step (β) can optionally be conducted under inert gas atmosphere, under an atmosphere composed of an inert gas/carbon dioxide mixture or under a carbon dioxide atmosphere. Activation in the context of this invention refers to a step in which a portion of alkylene oxide is added to the DMC catalyst suspension at temperatures of 90° C. to 150° C. and then the addition of the alkylene oxide is stopped, with observation of evolution of heat caused by a subsequent exothermic chemical reaction, which can lead to a temperature spike ("hotspot"), and of a pressure drop in the reactor caused by the conversion of alkylene oxide and possibly $CO_2$. The process step of activation is the period of time from the addition of the portion of alkylene oxide, optionally in the presence of $CO_2$, to the DMC catalyst until the occurrence of the evolution of heat. Optionally, the portion of the alkylene oxide can be added to the DMC catalyst in a plurality of individual steps, optionally in the presence of $CO_2$, and then the addition of the alkylene oxide can be stopped in each case. In this case, the process step of activation comprises the period from the addition of the first portion of alkylene oxide, optionally in the presence of $CO_2$, to the DMC catalyst until the occurrence of the evolution of heat after addition of the last portion of alkylene oxide. In general, the activation step may be preceded by a step for drying the DMC catalyst and optionally the suspension medium at elevated temperature and/or reduced pressure, optionally with passage of an inert gas through the reaction mixture.

In a preferred embodiment step (β) is performed under an inert gas atmosphere, under an inert gas/carbon dioxide mixture atmosphere or under a carbon dioxide atmosphere; step (β) is particularly preferably performed under a carbon dioxide atmosphere.

The metered addition of one or more alkylene oxides (and optionally of the carbon dioxide) can in principle be effected in different ways. The metered addition can be started from the reduced pressure or at a preselected supply pressure. The supply pressure is preferably established by introducing an inert gas (for example nitrogen or argon) carbon dioxide, the (absolute) pressure being 5 mbar to 100 bar, preferably 10 mbar to 50 bar and more preferably 20 mbar to 50 bar.

In a preferred embodiment, the amount of one or more alkylene oxides used in the activation in step (β) is 0.1% to 25.0% by weight, preferably 1.0% to 25.0% by weight, more preferably 2.0% to 16.0% by weight (based on the amount of suspension medium used in step (α)). The alkylene oxide can be added in one step or in two or more portions. Preferably, addition of a portion of the alkylene oxide is followed by interruption of the addition of the alkylene oxide until the occurrence of evolution of heat, and only then is the next portion of alkylene oxide. Preference is also given to a two-stage activation (step β), wherein (β1) in a first activation stage a first portion of alkylene oxide is added under inert gas atmosphere and (β2) in a second activation stage a second portion of alkylene oxide is added under carbon dioxide atmosphere.

Step (γ):

The metered addition of the carboxylic acid, alkylene oxide and optionally also of the carbon dioxide can be effected simultaneously or sequentially (in portions); for example, it is possible to add the total amount of carbon dioxide, the amount of carboxylic acid and/or the amount of alkylene oxides metered in in step (γ) all at once or continuously. The term "continuous" as used here can be defined as a mode of addition of a reactant such that a concentration of the reactant effective for the copolymerization is maintained, meaning that, for example, the metered addition can be effected with a constant metering rate, with a varying metering rate or in portions.

It is possible, during the addition of the alkylene oxide and/or the carboxylic acid, to increase or lower the $CO_2$ pressure gradually or stepwise or to leave it constant. Preferably, the total pressure is kept constant during the reaction by replenishment of carbon dioxide. The metered addition of alkylene oxide and/or of carboxylic acid is effected simultaneously or sequentially with respect to the metered addition of carbon dioxide. It is possible to meter in the alkylene oxide with a constant metering rate or to increase or lower the metering rate gradually or stepwise or to add the alkylene oxide in portions. Preferably, the alkylene oxide is added to the reaction mixture at a constant metering rate. If two or more alkylene oxides are used for synthesis of the polyether carbonate polyols, the alkylene oxides can be metered in individually or as a mixture. The metered addition of the alkylene oxides or the carboxylic acid can be effected simultaneously or sequentially (in portions) via separate feeds (additions) or via one or more feeds, in which case the alkylene oxide or the carboxylic acid can be metered in individually or as a mixture. It is possible via the manner and/or sequence of the metered addition of the carboxylic acid, the alkylene oxides and/or the carbon dioxide to synthesize random, alternating, block or gradient polyether carbonate polyols.

In a preferred embodiment, in step (γ), the metered addition of the carboxylic acid is terminated at a juncture prior to the addition of the alkylene oxide.

One feature of a preferred embodiment of the process according to the invention is that in step (γ) the total amount of the carboxylic acid is added. This addition can be effected at a constant metering rate, with a varying metering rate, or in portions.

It is preferable when the polyether carbonate polyols are produced in a continuous process, wherein step (γ) DMC catalyst and one or more carboxylic acids are metered into the reactor continuously during the reaction and the resulting reaction mixture is removed from the reactor continuously.

The metered addition of the alkylene oxide, the carboxylic acid and the DMC catalyst can be effected via separate metering points. In a preferred embodiment, the alkylene oxide and the carboxylic acid are fed into the reaction mixture via separate metering points. In a further embodiment the double metal cyanide catalyst and the carboxylic acid are supplied to the reaction mixture via separate metering points.

For the process according to the invention, it has additionally been found that the copolymerization (step (γ)) for preparation of the polyether carbonate polyols is conducted advantageously at a temperature of 90° C. to 150° C., preferably at 100° C. to 130° C., more preferably at 100° C. to 130° C. If temperatures below 90° C. are set, the reaction becomes very slow in the presence of carboxylic acids. At temperatures above 150° C., the amount of unwanted by-products rises significantly. In a preferred embodiment steps (β) and/or (γ) are performed at a temperature of ≥100° C. to ≤130° C.

Preference is given to using an excess of carbon dioxide based on the calculated amount of carbon dioxide incorporated in the polyether carbonate polyol, since an excess of carbon dioxide is advantageous because of the inertness of carbon dioxide. The amount of carbon dioxide can be fixed via the total pressure under the particular reaction conditions. An advantageous total (absolute) pressure for the copolymerization for preparation of the polyether carbonate polyols has been found to be the range from 0.01 to 120 bar, preferably 0.1 to 110 bar, more preferably from 1 to 100 bar. It is possible to feed in the carbon dioxide continuously or discontinuously. This depends on how quickly the alkylene oxides are consumed and whether the product is supposed to contain any $CO_2$-free polyether blocks. The amount of the carbon dioxide (reported as pressure) can likewise vary in the course of addition of the alkylene oxides. $CO_2$ may also be added to the reactor as a solid and then converted to the gaseous, dissolved, liquid and/or supercritical state under the chosen reaction conditions. In a preferred embodiment steps (β) and/or (γ) are performed at a pressure of ≥10 mbar to ≤100 bar.

Steps (α), (β) and (γ) can be conducted in the same reactor or each separately in different reactors. Particularly preferred reactor types are: tubular reactors, stirred tanks, loop reactors.

Polyether carbonate polyols can be prepared in a stirred tank, in which case the stirred tank, according to the embodiment and mode of operation, is cooled via the reactor jacket, internal cooling surfaces and/or cooling surfaces within a pumped circulation system. Both in semi-batchwise application, in which the product is not removed until after the end of the reaction, and in continuous application, in which the product is removed continuously, particular attention should be paid to the metering rate of the alkylene oxide. It should be adjusted such that the alkylene oxides react sufficiently rapidly despite the inhibiting effect of the carbon dioxide. The concentration of free alkylene oxides in the reaction mixture during the activation step (step β) is preferably >0% to 100% by weight, more preferably >0% to 50% by weight, most preferably >0% to 20% by weight (based in each case on the weight of the reaction mixture). The concentration of free alkylene oxides in the reaction mixture during the reaction (step γ) is preferably >0% to 40% by weight, more preferably >0% to 25% by weight, most preferably >0% to 15% by weight (based in each case on the weight of the reaction mixture).

In a preferred embodiment, the mixture comprising the activated DMC catalyst that results from steps (α) and (β) is reacted further in the same reactor with one or more alkylene oxide(s), one or more starter substance(s) and carbon dioxide. In a further preferred embodiment, the mixture comprising activated DMC catalyst that results from steps (α) and (β) is reacted further with alkylene oxides, one or more starter substance(s) and carbon dioxide in another reaction vessel (for example a stirred tank, tubular reactor or loop reactor).

In the case of a reaction conducted in a tubular reactor, the mixture comprising activated DMC catalyst that results from steps (α) and (β), one or more H-functional starter substance(s), one or more alkylene oxide(s) and carbon dioxide are pumped continuously through a tube. The molar ratios of the co-reactants vary according to the desired polymer. In a preferred embodiment, carbon dioxide is metered in here in its liquid or supercritical form, in order to enable optimal miscibility of the components. It is advantageous to install mixing elements for better mixing of the co-reactants as are marketed for example by Ehrfeld Mikrotechnik BTS GmbH or mixer-heat exchanger elements which simultaneously improve mixing and heat removal.

Loop reactors can likewise be used for preparation of polyether carbonate polyols. These generally include reactors having recycling of matter, for example a jet loop reactor, which can also be operated continuously, or a tubular reactor designed in the form of a loop with suitable apparatuses for the circulation of the reaction mixture, or a loop of several series-connected tubular reactors. The use of a loop reactor is advantageous especially because backmixing can be achieved here, such that it is possible to keep the concentration of free alkylene oxides in the reaction mixture within the optimal range, preferably in the range from >0% to 40% by weight, more preferably >0% to 25% by weight, most preferably >0% to 15% by weight (based in each case on the weight of the reaction mixture).

For example, for the continuous process for preparing the polyether carbonate polyols in steps (α) and (β), a mixture containing activated DMC catalyst is prepared, then, in step (γ),
(γ1) a portion each of carboxylic acid, alkylene oxide and carbon dioxide are metered in to initiate the copolymerization, and
(γ2) during the progress of the copolymerization, the remaining amount of each of DMC catalyst, carboxylic acid and alkylene oxide is metered in continuously in the presence of carbon dioxide, with simultaneous continuous removal of resulting reaction mixture from the reactor.

In step (γ), the amount DMC catalyst is preferably chosen such that the content of DMC catalyst in the reaction product resulting in step (γ) is 10 to 10 000 ppm, more preferably 20 to 5000 ppm and most preferably 50 to 500 ppm.

Preferably, steps (α) and (β) are conducted in a first reactor, and the resulting reaction mixture is then transferred into a second reactor for the copolymerization in step (γ). It is also possible to conduct steps (α), (β) and (γ) in one reactor.

It has also surprisingly been found that the process of the present invention can be used for preparation of large amounts of the polyether carbonate polyol, in which case a DMC catalyst activated according to steps (α) and (β) in suspension medium is initially used, and the DMC catalyst is added without prior activation during the copolymerization (γ).

A particularly advantageous feature of the preferred embodiment of the present invention is thus the ability to use "fresh" DMC catalysts without activation of the portion of DMC catalyst which is added continuously in step (γ). An activation of DMC catalysts to be conducted analogously to step (β) encompasses not just additional attention from the operator, which results in an increase in manufacturing costs, but also requires a pressure reaction vessel, which also results in an increase in the capital costs in the construction of a corresponding production plant. Here, "fresh" DMC catalyst is defined as unactivated DMC catalyst in solid form or in the form of a slurry in suspension medium. The ability of the present process to use fresh unactivated DMC catalyst in step (γ) enables significant savings in the commercial preparation of polyether carbonate polyols and is a preferred embodiment of the present invention.

The term "continuously" used here can be defined as the mode of addition of a relevant catalyst or reactant such that an essentially continuous effective concentration of the DMC catalyst or the reactant is maintained. The catalysts can be fed in in a truly continuous manner or in relatively tightly spaced increments. Equally, continuous addition of carboxylic acid can be effected in a truly continuous manner or in increments. There would be no departure from the present process in adding a DMC catalyst or reactants incrementally such that the concentration of the materials added drops essentially to zero for a period prior to the next incremental addition. However, it is preferable that the DMC catalyst concentration is kept essentially at the same concentration during the main portion of the procedure of the continuous reaction, and that starter substance is present during the main portion of the copolymerization process. Incremental addition of DMC catalyst and/or reactant that does not significantly affect the characteristics of the product is nevertheless "continuous" in that sense in which the term is used here. It is possible, for example, to provide a recycling loop in which a portion of the reacting mixture is recycled to a prior point in the process, which smoothes out discontinuities caused by incremental additions.

Step (δ)

In step (δ) the reaction mixture obtained in step (γ) which generally comprises a content of 0.05% by weight to 10% by weight of alkylene oxide is subjected in the reactor to a postreaction or continuously transferred into a postreactor for postreaction, wherein by way of the postreaction the content of free alkylene oxide is reduced. In step (δ) by way of the postreaction the content of free alkylene oxide is preferably reduced to less than 0.5 g/l, more preferably to less than 0.1 g/l, in the reaction mixture.

When the reaction mixture obtained in step (γ) remains in the reactor the reaction mixture is preferably held for 10 min to 24 h at a temperature of 60° C. to 140° C., more preferably 1 h to 12 h at a temperature of 80° C. to 130° C. for the purposes of postreaction. The reaction mixture is preferably stirred during this until the content of free alkylene oxide has fallen to less than 0.5 g/l, more preferably to less than 0.1 g/l, in the reaction mixture. The consumption of free alkylene oxide and optionally carbon dioxide generally causes the pressure in the reactor to fall during the postreaction in step (δ) until a constant value has been achieved.

The postreactor used may, for example, be a tubular reactor, a loop reactor or a stirred tank. Preferably, the pressure in this postreactor is at the same pressure as in the reaction apparatuses in which reaction step (γ) is conducted. However, the pressure chosen in the downstream reactor may also be higher or lower. In a further preferred embodiment, the carbon dioxide is fully or partly discharged after reaction step (γ) and the downstream reactor is operated at standard pressure or a low positive pressure. The temperature in the downstream reactor is preferably 50 to 150° C. and more preferably 80 to 140° C.

The postreactor employed is preferably a tubular reactor, wherein for example a single tubular reactor or else a cascade of a plurality of tubular reactors arranged in parallel or linearly arranged in series may be used. The residence time is preferably between 5 min and 10 h, more preferably between 10 min and 5 h.

Alkylene Oxides

The process according to the invention may generally employ alkylene oxides (epoxides) having 2-24 carbon atoms. The alkylene oxides having 2-24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or poly-epoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkoxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxy silane. Alkylene oxides used are preferably ethylene oxide, propylene oxide and/or styrene oxide, more preferably propylene oxide.

In one embodiment one or more compounds from the group of solvents or one or more H-functional starter compounds selected from the group consisting of polyether polyols, polycarbonate polyols, polyester carbonate polyols, polyether ester carbonate polyols or polyether carbonate polyols are employed in step (α) as a further suspension medium, wherein these H-functional starter compounds each have a hydroxyl number in the range from 3.0 mgKOH/g to 1000 mgKOH/g.

DMC Catalysts

DMC catalysts for use in the homopolymerization of alkylene oxides are known in principle from the prior art (see, for example, U.S. Pat. Nos. 3,404,109, 3,829,505, 3,941,849 and 5,158,922). DMC catalysts, which are described, for example, in U.S. Pat. No. 5,470,813, EP-A 700 949, EP-A 743 093, EP-A 761 708, WO 97/40086, WO 98/16310 and WO 00/47649, have a very high activity and enable the preparation of polyether carbonate polyols at very low catalyst concentrations, such that a removal of the catalyst from the finished product is generally not required. A typical example is that of the highly active DMC catalysts which are described in EP-A 700 949 and contain not only a double metal cyanide compound (e.g. zinc hexacyanocobaltate(III)) and an organic complex ligand (e.g. tert-butanol) but also a polyether having a number-average molecular weight greater than 500 g/mol.

The DMC catalysts are preferably obtained by
(i) reacting an aqueous solution of a metal salt with the aqueous solution of a metal cyanide salt in the presence of one or more organic complex ligands, e.g. an ether or alcohol, in a first step,
(ii) in the second step separating the solids from the suspension obtained in (i) by known techniques (such as centrifugation or filtration),
(iii) in a third step optionally washing the isolated solids with an aqueous solution of an organic complex ligand (for example by resuspension and subsequently reisolation by filtration or centrifugation),
(iv) then drying the solids obtained at temperatures of generally 20-120° C. and at pressures of generally 0.1 mbar to atmospheric pressure (1013 mbar), optionally after pulverizing,
and by, in the first step or immediately after the precipitation of the double metal cyanide compound (second step), adding one or more organic complex ligands, preferably in excess (based on the double metal cyanide compound) and optionally further complex-forming components.

The double metal cyanide compounds present in the DMC catalysts are the reaction products of water-soluble metal salts and water-soluble metal cyanide salts.

For example, an aqueous solution of zinc chloride (preferably in excess based on the metal cyanide salt, for example potassium hexacyanocobaltate) and potassium hexacyanocobaltate are mixed and then dimethoxyethane (glyme) or tert-butanol (preferably in excess, based on zinc hexacyanocobaltate) is added to the suspension formed.

Metal salts suitable for preparation of the double metal cyanide compounds preferably have the general formula (II)

$$M(X)_n \qquad (II)$$

wherein

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

n is 1 when X=sulfate, carbonate or oxalate and n is 2 when X=halide, hydroxide, carboxylate, cyanate, thiocyanate, isocyanate, isothiocyanate or nitrate, or suitable metal salts have the general formula (III)

$$M_r(X)_3 \qquad (III)$$

wherein

M is selected from the metal cations $Fe^{3+}$, $Al^{3+}$, $Co^{3+}$ and $Cr^{3+}$, X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

r is 2 when X=sulfate, carbonate or oxalate and r is 1 when X=halide, hydroxide, carboxylate, cyanate, thiocyanate, isocyanate, isothiocyanate or nitrate, or suitable metal salts have the general formula (IV)

$$M(X)_s \qquad (IV)$$

wherein

M is selected from the metal cations $Mo^{4+}$, $V^{4+}$ and $W^{4+}$,

X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

s is 2 when X=sulfate, carbonate or oxalate and s is 4 when X=halide, hydroxide, carboxylate, cyanate, thiocyanate, isocyanate, isothiocyanate or nitrate, or suitable metal salts have the general formula (V)

$$M(X)_t \qquad (V)$$

wherein

M is selected from the metal cations $Mo^{6+}$ and $W^{6+}$,

X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

t is 3 when X=sulfate, carbonate or oxalate and t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have the general formula (VI)

$$(Y)_a M'(CN)_b (A)_c \qquad (VI)$$

wherein

M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate and a, b and c are integers, where the values of a, b and c are selected so as to give an electrically neutral metal cyanide salt; a is preferably 1, 2, 3 or 4; b is preferably 4, 5 or 6; c preferably has the value of 0.

Examples of suitable metal cyanide salts are sodium hexacyanocobaltate(III), potassium hexacyanocobaltate (III), potassium hexacyanoferrate(II), potassium hexacyanoferrate(III), calcium hexacyanocobaltate(III) and lithium hexacyanocobaltate(III).

Preferred double metal cyanide compounds present in the DMC catalysts are compounds of general formula (VII)

$$M_x[M'_{x'}(CN)_y]_z \qquad (VII)$$

where M is as defined in formula (II) to (V) and

M' is as defined in formula (VI), and x, x', y and z are integers and are chosen so as to ensure electronic neutrality of the double metal cyanide compound.

Preferably, x=3, x'=1, y=6 and z=2,

M=Zn(II), Fe(II), Co(II) or Ni(II) and

M'=Co(III), Fe(III), Cr(III) or Ir(III).

Examples of suitable double metal cyanide catalysts are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086). The organic complex ligands used are, for example, water-soluble organic compounds containing heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butyl, isobutanol, sec-butanol, tert-butanol, 2-methyl-3-buten-2-ol and 2-methyl-3-butyn-2-ol), compounds containing both aliphatic or cycloaliphatic ether groups and aliphatic hydroxyl groups (for example ethylene glycol mono-tert-butyl ether, diethylene glycol mono-tert-butyl ether, dipropylene glycol monomethyl ether and 3-methyl-3-oxetanemethanol). The organic complex ligands given greatest preference are selected from one or more compounds of the group consisting of dimethoxyethane, tert-butanol 2-methyl-3-buten-2-ol, 2-methyl-3-butyn-2-ol, ethylene glycol mono-tert-butyl ether and 3-methyl-3-oxetanemethanol.

Optionally used in the preparation of the DMC catalysts are one or more complex-forming component(s) from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ethers, polyvinyl ethyl ethers, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethyl cellulose and polyacetals, or of the glycidyl ethers, glycosides, carboxylic esters of polyhydric alcohols, gallic acids or salts, esters or amides thereof, cyclodextrins, phosphorus compounds, α,β-unsaturated carboxylic esters or ionic surface- or interface-active compounds.

Preferably, in the preparation of the DMC catalysts, in the first step, the aqueous solutions of the metal salt (e.g. zinc chloride), used in a stoichiometric excess (at least 50 mol %) based on metal cyanide salt (i.e. at least a molar ratio of metal salt the metal cyanide salt of 2.25:1.00), and of the metal cyanide salt (e.g. potassium hexacyanocobaltate) are converted in the presence of the organic complex ligand (e.g. tert-butanol), forming a suspension containing the double metal cyanide compound (e.g. zinc hexacyanocobaltate), water, excess metal salt and the organic complex ligand.

The organic complex ligand may be present in the aqueous solution of the metal salt and/or the metal cyanide salt, or it is added directly to the suspension obtained after precipitation of the double metal cyanide compound. It has been found to be advantageous to mix the aqueous solutions of the metal salt and the metal cyanide salt and the organic complex ligand with vigorous stirring. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser as described in WO-A 01/39883.

In the second step, the solid (i.e. the precursor of the catalyst) is isolated from the suspension by known techniques, such as centrifugation or filtration.

In a preferred variant, the isolated solids, in a third process step, are then washed with an aqueous solution of the organic complex ligand (for example by resuspension and subsequent reisolation by filtration or centrifugation). In this way, it is possible, for example, to remove water-soluble by-products, such as potassium chloride, from the catalyst. Preferably, the amount of the organic complex ligand in the aqueous wash solution is between 40% and 80% by weight, based on the overall solution.

Optionally, in the third step, further complex-forming component is added to the aqueous wash solution, preferably in the range between 0.5% and 5% by weight, based on the overall solution.

It is also advantageous to wash the isolated solids more than once. Preferably, in a first wash step (iii-1), washing is effected with an aqueous solution of the organic complex ligand (for example by resuspension and subsequently reisolation by filtration or centrifugation), in order in this way to remove, for example, water-soluble by-products, such as potassium chloride, from the catalyst. More preferably, the amount of the organic complex ligand in the aqueous wash solution is between 40% and 80% by weight, based on the overall solution for the first wash step. In the further wash steps (iii-2), either the first wash step is repeated once or more than once, preferably once to three times, or, preferably, a nonaqueous solution, for example a mixture or solution of organic complex ligand and further complex-forming component (preferably in the range between 0.5 and 5% by weight, based on the total amount of the wash solution in step (iii-2)), is used as a wash solution to wash the solid once or more than once, preferably once to three times.

The isolated and optionally washed solid is subsequently dried at temperatures of generally 20-100° C. and at pressures of generally 0.1 mbar to atmospheric pressure (1013 mbar), optionally after pulverizing.

A preferred process for isolation of the DMC catalysts from the suspension by filtration, filtercake washing and drying is described in WO-A 01/80994.

As well as the DMC catalysts based on zinc hexacyanocobaltate ($Zn_3[Co(CN)_6]_2$) that are used with preference, it is also possible to use other metal complex catalysts based on the metals zinc and/or cobalt that are known from the prior art for the copolymerization or epoxides and carbon dioxide for the process according to the invention. This especially includes what are called zinc glutarate catalysts (described, for example, in M. H. Chisholm et al., Macromolecules 2002, 35, 6494), what are called zinc diiminate catalysts (described, for example, in S. D. Allen, J. Am. Chem. Soc. 2002, 124, 14284), what are called cobalt salen catalysts (described, for example, in U.S. Pat. No. 7,304,172 B2, US 2012/0165549 A1)) and bimetallic zinc complexes with macrocyclic ligands (described, for example, in M. R. Kember et al., Angew. Chem., Int. Ed., 2009, 48, 931).

The polyether carbonate polyols obtained in accordance with the process according to the invention preferably have a functionality of 2 to 8, more preferably of 2 to 6 and most preferably of 2 to 4. The molecular weight is preferably 400 to 100 000 g/mol and more preferably 500 to 6000 g/mol. The $CO_2$ content is preferably $\geq 5$ to $\leq 35$ wt % and particularly preferably $\geq 8$ to $\leq 25$ wt %.

The polyether carbonate polyols obtainable by the process according to the invention have a low content of by-products and can be processed without difficulty, especially by reaction with di- and/or polyisocyanates to afford polyurethanes, in particular flexible polyurethane foams. For polyurethane applications, it is preferable to use polyether carbonate polyols based on a carboxylic acid having a functionality of at least 2. In addition, the polyether carbonate polyols obtainable by the process according to the invention can be used in applications such as washing and cleaning composition formulations, drilling fluids, fuel additives, ionic and nonionic surfactants, lubricants, process chemicals for papermaking or textile manufacture, or cosmetic formulations. The person skilled in the art is aware that, depending on the respective field of use, the polyether carbonate polyols to be used have to fulfill certain physical properties, for example molecular weight, viscosity, functionality and/or hydroxyl number.

The invention is more particularly elucidated by the examples that follow without, however, being limited thereto.

EXAMPLES

Feedstocks:

H-functional starter compounds:

Pimelic acid—difunctional carboxylic acid having a pKa of 4.71

Oxalic acid—difunctional carboxylic acid having a pKa of 1.46

Citric acid—tetrafunctional hydroxycarboxylic acid having a first pKa of 3.14

Epoxides:

PO: propylene oxide

Suspension Media:

cPC: cyclic propylene carbonate toluene

Catalyst:

The DMC catalyst used in all examples was DMC catalyst prepared according to example 6 in WO 01/80994 A1.

Methods:

The polymerization reactions were conducted in a 300 ml Parr pressure reactor. The pressure reactor used in the examples had an (internal) height of 10.16 cm and an internal diameter of 6.35 cm. The reactor was equipped with an electrical heating jacket (510 watt maximum heating power). The counter-cooling consisted of an immersed tube of external diameter 6 mm which had been bent into a U shape and which projected into the reactor up to 5 mm above the base, and through which cooling water flowed at about 10° C. The water flow was switched on and off by means of a magnetic valve. In addition, the reactor was equipped with an inlet tube and a thermal sensor of diameter 1.6 mm, which both projected into the reactor up to 3 mm above the base.

The sparging stirrer used in the examples was a hollow shaft stirrer in which the gas was introduced into the reaction mixture via a hollow shaft in the stirrer. The stirrer body attached to the hollow shaft comprised four arms, had a diameter of 35 mm and a height of 14 mm. Each end of the arm had two gas outlets of 3 mm in diameter attached to it. The rotation of the stirrer gave rise to a reduced pressure such that the gas present above the reaction mixture ($CO_2$ and possibly alkylene oxide) was drawn off and introduced through the hollow shaft of the stirrer into the reaction mixture. The description "rpm" relates to the number of revolutions of the stirrer per minute.

The reaction was monitored using in situ IR spectroscopy. A Bruker Matrix-FM 120200MX instrument having a 3 mm diamond-tipped probe was used to this end. Using calibration data from the diamond-tipped probe the relevant concentrations of the reaction components were calculated from the measured spectra using S-PACT PEAXACT software.

The obtained reaction mixture was diluted with dichloromethane (20 ml) and the solution passed through a falling film evaporator. The solution (0.1 kg in 3 h) ran down along the inner wall of a tube of 70 mm in diameter and 200 mm in length which was externally heated to 120° C., wherein the reaction mixture was uniformly distributed as a thin film on the inner wall of the falling film evaporator by three rollers of 10 mm in diameter each rotating at a speed of 250 rpm. A pressure of 3 mbar was established inside the tube by means of a pump. The reaction mixture purified of volatile constituents (unconverted epoxides, cyclic carbonate, solvent) was collected in a receiver at the lower end of the heated tube.

a) The copolymerization of propylene oxide and $CO_2$ afforded not only the cyclic propylene carbonate but also the polyether carbonate polyol which contains polycarbonate units shown in the formula below

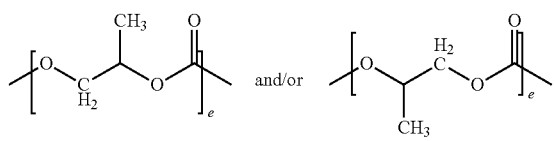

and polyether units shown in the formula below.

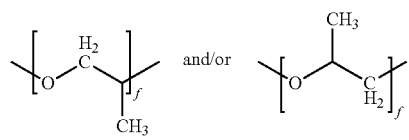

The molar ratio of carbonate groups to ether groups in the polyether carbonate polyol (e/f ratio) was determined by 41-NMR spectroscopy. A sample of the purified reaction mixture was additionally in each case dissolved in deuterated chloroform and measured on a Bruker spectrometer (Bruker, DPX 400, 400 MHz; pulse program zg30, relaxation delay d1: 10 s, 64 scans).

The relevant resonances in the $^1$H NMR spectrum (based on TMS=0 ppm) which were used for integration are as follows:

I1: 1.10-1.17 ppm: $CH_3$ group of the polyether units, resonance area corresponds to three hydrogen atoms, I2: 1.25-1.34 ppm: $CH_3$ group of the polycarbonate units, resonance area corresponds to three hydrogen atoms, The proportion of carbonate groups (mol %), the proportion of ether groups (mol %), the proportion of NCA groups (mol %), the $CO_2$ proportion (% by weight) and the molar ratio of carbonate groups to ether groups (e/f) in the polyether carbonate polyol are reported. The values were calculated as follows:

Relative Proportion of Carbonate Groups (Mol %) in the Polyether Carbonate Polyol:

$$\text{carbonate group incorporation (mol \%)} = \left[\frac{\left(\frac{I2}{3}\right)}{\left(\frac{I1}{3}\right)+\left(\frac{I2}{3}\right)}\right]*100$$

Relative Proportion of Ether Groups (Mol %) in the Polyether Carbonate Polyol:

$$\text{ether group incorporation (mol \%)} = \left[\frac{\left(\frac{I1}{3}\right)}{\left(\frac{I1}{3}\right)+\left(\frac{I2}{3}\right)}\right]*100$$

$CO_2$ Proportion (% by Weight) in the Polyether Carbonate Polyol:

$$CO_2 \text{ proportion (\% by weight)} = \left[\frac{\left(\frac{I2}{3}\right)*44}{\left(\frac{I1}{3}*58\right)+\left(\frac{I2}{3}*102\right)}\right]*100$$

Molar Ratio of Carbonate Groups to Ether Groups in the Polyether Carbonate Polyol (e/f):

$e/f=I2/I1$

OH Number (Hydroxyl Number):

OH number (hydroxyl number) was determined in accordance with DIN 53240-2, except that N-methylpyrrolidone was used as solvent in place of THF/dichloromethane. The titration was carried out with 0.5 molar ethanolic KOH solution. The end point recognition was carried out by potentiometry. Castor oil of certified OH number was used as test substance. The reported "$mg_{KOH}/g$" unit refers to mg[KOH]/g[polyether carbonate polyol].

Gel Permeation Chromatography:

The number-average molecular weight $M_n$ and the weight-average molecular weight $M_w$ of the polyether carbonate polyols obtained was determined by means of gel permeation chromatography (GPC). The procedure of DIN 55672-1 was followed:

"Gel permeation chromatography, Part 1—Tetrahydrofuran as eluent" (SECurity GPC System from PSS Polymer Service, flow rate 1.0 ml/min; columns: 2×PSS SDV linear M, 8×300 mm, 5 μm; RID detector). Polystyrene samples of known molar mass were used for calibration. Polydispersity (PDI) was calculated as the ratio $M_w/M_n$.

Example 1: Preparation of a Polyether Carbonate Polyol with Citric Acid as the Starter in Step γ

Step α:

Into a 300 ml pressure reactor fitted with a sparging stirrer and a 3 mm diamond-tipped FT-IR probe a mixture of DMC catalyst (24 mg) and toluene (30 ml) was initially charged and stirred for 15 min at 25° C. while passing argon through the reaction mixture (800 rpm).

Step β:

The suspension was then heated to 130° C. and pressurized with 15 bar of $CO_2$, resulting in a small temperature drop. Once a temperature of 130° C. had been reestablished 2 g of propylene oxide were metered in via an HPLC pump (3 ml/min). The reaction mixture was stirred at 130° C. (800 rpm) until the characteristic bands for propylene oxide were no longer detectable by in situ IR spectroscopy. The addition of 2 g of propylene oxide was repeated for a second and a third time.

Step γ:

The temperature was held at 130° C. and during the subsequent steps the pressure in the pressure reactor was held at 15 bar by replenishment of $CO_2$. A further 52.2 g of propylene oxide were metered in via an HPLC pump (0.7 ml/min) with stirring (800 rpm). Starting at the same point in time at which the addition of propylene oxide in step γ was started, citric acid (0.02 mol; 2.88 g) dissolved in 1,4-dioxane (0.2 g/ml; 14.5 ml) was added via a separate HPLC pump (0.25 ml/min). The characteristic band for carboxylic acid was not detectable by in situ IR spectroscopy. Once the addition of propylene oxide had ended the reaction mixture was stirred for a further 45 min at 130° C. The reaction was terminated by cooling the pressure reactor in an ice bath. The positive pressure was released.

The low-boiling constituents of the reaction mixture were removed using a falling film evaporator and the resulting product analyzed. The proportion of the carbonate groups (mol %) and ether groups (mol %) incorporated in the polyether carbonate polyol obtained, the $CO_2$ proportion (% by weight), the ratio of carbonate to ether units, the obtained molecular weight and the polydispersity index (PDI) are reported in table 1.

Comparative Example 2: Preparation of a Polyether Carbonate Polyol with Citric Acid as the Starter in Step α

Step α:

Into a 300 ml pressure reactor fitted with a sparging stirrer and a 3 mm diamond-tipped FT-IR probe a mixture of DMC catalyst (24 mg), toluene (30 ml) and a solution of citric acid in 1,4-dioxane (2.88 g citric acid; 0.2 g/ml) was initially charged and stirred for 15 min at 25° C. while passing argon through the reaction mixture (800 rpm).

Step β:

The suspension was then heated to 130° C. and pressurized with 15 bar of $CO_2$, resulting in a small temperature drop. Once a temperature of 130° C. had been reestablished 2 g of propylene oxide were metered in via an HPLC pump (3 ml/min). The reaction mixture was stirred at 130° C. for 20 min (800 rpm). No decrease in the characteristic stretching bands for propylene oxide was detected by in situ IR spectroscopy. No conversion of propylene oxide took place. The addition of 2 g of propylene oxide was repeated for a second and a third time. The reaction mixture was stirred at 130° C. for 20 min in each case (800 rpm). No decrease in the characteristic stretching bands for propylene oxide was detected by in situ IR spectroscopy. No conversion of propylene oxide took place. Due to the accumulation of propylene oxide in the reaction mixture the reaction was aborted.

No polyether carbonate polyol was obtained.

Comparison

Table 1 which follows shows a comparison of the results obtained using citric acid as a starter for continuous metered addition of citric acid during step γ (semi-batch CAOS process, example 1) compared to an initial charge of citric acid in step α (semi-batch process, comparative example 2).

TABLE 1

| Example | Metered addition of starter | Carbonate groups [mol %] | Ether groups [mol %] | $CO_2$ proportion [% by weight] | e/f [—] | $M_n$ [g/mol] | PDI [—] |
|---|---|---|---|---|---|---|---|
| 1 | Continuous metered addition in step γ | 10.4 | 89.6 | 7.3 | 0.09 | 6118 | 2.4 |
| 2 (comp.) | Initial charge in step α | | | No polymer formation | | | | comp.: Comparative example

Table 1 shows that for continuous metered addition of citric acid in step γ polyether carbonate polyols are obtained (example 1) while for an initial charge in step α (comparative example 2) no polymer formation takes place. Continuous metered addition in step γ (CAOS process) is accordingly essential for preparation of polyether carbonate polyols using acid-functional starters.

Example 3: Preparation of a Polyether Carbonate Polyol with Pimelic Acid as the Starter in Step γ

Step α:

Into a 300 ml pressure reactor fitted with a sparging stirrer and a 3 mm diamond-tipped FT-IR probe a mixture of DMC catalyst (24 mg) and toluene (30 ml) was initially charged and stirred for 15 min at 25° C. while passing argon through the reaction mixture (800 rpm).

Step β:

The suspension was then heated to 130° C. and pressurized with 15 bar of $CO_2$, resulting in a small temperature drop. Once a temperature of 130° C. had been reestablished 2 g of propylene oxide were metered in via an HPLC pump (3 ml/min). The reaction mixture was stirred at 130° C. (800 rpm) until the characteristic bands for propylene oxide were no longer detectable by in situ IR spectroscopy. The addition of 2 g of propylene oxide was repeated for a second and a third time.

Step γ:

The temperature was held at 130° C. and during the subsequent steps the pressure in the pressure reactor was held at 15 bar by replenishment of $CO_2$. A further 56.6 g of propylene oxide were metered in via an HPLC pump (0.7 ml/min) with stirring (800 rpm). Starting at the same point in time at which the addition of propylene oxide in step γ was started, pimelic acid (0.02 mol; 2.40 g) dissolved in 1,4-dioxane (0.3 g/ml; 8.09 ml) was added via a separate HPLC pump (0.16 ml/min). The characteristic band for carboxylic acid was not detectable by in situ IR spectroscopy. Once the addition of propylene oxide had ended the reaction mixture was stirred for a further 45 min at 130° C. The reaction was terminated by cooling the pressure reactor in an ice bath. The positive pressure was released.

The low-boiling constituents of the reaction mixture were removed using a falling film evaporator and the resulting product analyzed. The proportion of the carbonate groups (mol %) and ether groups (mol %) incorporated in the polyether carbonate polyol obtained, the $CO_2$ proportion (% by weight), the ratio of carbonate to ether units, the obtained molecular weight and the polydispersity index (PDI) are reported in table 2.

Comparative Example 4: Preparation of a Polyether Carbonate Polyol with Oxalic Acid as the Starter in Step γ

Step α:

Into a 300 ml pressure reactor fitted with a sparging stirrer and a 3 mm diamond-tipped FT-IR probe a mixture of DMC catalyst (12 mg) and toluene (30 ml) was initially charged and stirred for 15 min at 25° C. while passing argon through the reaction mixture (800 rpm).

Step β:

The suspension was then heated to 130° C. and pressurized with 15 bar of $CO_2$, resulting in a small temperature drop. Once a temperature of 130° C. had been reestablished 2 g of propylene oxide were metered in via an HPLC pump (3 ml/min). The reaction mixture was stirred at 130° C. (800 rpm) until the characteristic bands for propylene oxide were no longer detectable by in situ IR spectroscopy. The addition of 2 g of propylene oxide was repeated for a second and a third time.

Step γ:

The temperature was reduced to 100° C. and during the subsequent steps the pressure in the pressure reactor was held at 15 bar by replenishment of $CO_2$. A further 35 g of propylene oxide were metered in via an HPLC pump (0.5 ml/min) with stirring (800 rpm). Starting at the same point in time at which the addition of propylene oxide in step γ was started, oxalic acid (0.02 mol; 1.35 g) dissolved in diethyl ether (0.01 g/ml; 135 ml) was added via a separate HPLC pump (2.25 ml/min). A steady increase in the characteristic bands for propylene oxide were observed by in situ IR spectroscopy. Due to the accumulation of propylene oxide in the reaction mixture the reaction was aborted.

No polyether carbonate polyol was obtained.

Comparison

Table 2 which follows shows a comparison of the results obtained for continuous metering of citric acid (example 1) or pimelic acid (example 3) in step γ compared to use of oxalic acid (comparative example 4).

TABLE 2

| Example | Carboxylic acid | pKa | Carbonate groups [mol %] | Ether groups [mol %] | $CO_2$ proportion [% by weight] | e/f [—] | $M_n$ [g/mol] | PDI [—] |
|---|---|---|---|---|---|---|---|---|
| 1 | Citric acid | 3.14 | 10.4 | 89.6 | 7.3 | 0.09 | 6118 | 2.4 |
| 3 | Pimelic acid | 4.71 | 11.4 | 88.6 | 8.0 | 0.14 | 7034 | 2.2 |
| 4 (comp.) | Oxalic acid | 1.46 | No polymer formation | | | | | | comp.: Comparative example

Table 2 shows that upon use of a weakly acidic carboxylic acid (citric acid, pKa of 3.14, example 1 and pimelic acid, pKa of 4.71, example 3) polyether carbonate polyols are obtained while upon use of a strongly acidic carboxylic acid (oxalic acid, pKa of 1.46, comparative example 4) no polymer formation takes place.

The invention claimed is:

1. A process for preparing polyether carbonate polyols comprising adding alkylene oxides and carbon dioxide onto carboxylic acids in the presence of a double metal cyanide (DMC) catalyst, wherein one or more carboxylic acids are metered into the reactor continuously during the reaction, in which
   (i) said carboxylic acid is at least difunctional and has a pKa of not less than 1.5,
   (ii) the addition of said one or more carboxylic acids is effected such that at any point in time in the process the molar concentration of unconverted carboxylic acid in the reaction mixture does not exceed a value of 0.001 mol/g multiplied by the mass of the catalyst employed per liter of reaction mixture reported in grams, and
   (iii) any two carboxylic acid groups present in the same molecule are separated from one another at least by a carbon atom.

2. The process as claimed in claim 1, which comprises:
   (α) initially charging a suspension medium into a reactor, in which said suspension medium contains no H-functional groups and comprises at least one of aliphatic lactones, aromatic lactones, lactides, cyclic carbonates having at least three optionally substituted methylene groups between the oxygen atoms of the carbonate group, aliphatic cyclic anhydrides, and aromatic cyclic anhydrides, and
   (γ) continuously metering one or more carboxylic acids into the reactor during the reaction.

3. The process as claimed in claim 2, in which after (α) the process additionally comprises,
   (β) adding a portion of alkylene oxide to the mixture from (α) at temperatures of 90 to 150° C., wherein the addition of the alkylene oxide compound is then interrupted.

4. The process as claimed in claim 3, wherein (β) is performed under an inert gas atmosphere, under an inert gas/carbon dioxide mixture atmosphere or under a carbon dioxide atmosphere.

5. The process as claimed in claim 3, wherein DMC catalyst and one or more carboxylic acids are continuously metered into the reactor in (γ) during the reaction, and continuously removing the resulting reaction mixture from the reactor.

6. The process as claimed in claim 5, comprising supplying the double metal cyanide catalyst and the carboxylic acid to the reaction mixture via separate metering points.

7. The process as claimed in claim 3, wherein steps (β) and/or (γ) are performed at a temperature of ≥100° C. to ≤130° C.

8. The process as claimed in claim 3, wherein (β) and/or (γ) are performed at a pressure of ≥10 mbar to ≤100 bar.

9. The process as claimed in claim 3, in which (α) additionally comprises a further suspension medium comprising one or more compounds which comprises at least one solvent, and at least one H-functional starter compounds which comprises at least one polyether polyol, polycarbonate polyol, polyester carbonate polyol, polyether ester carbonate polyol and polyether carbonate polyol, wherein said H-functional starter compounds each have a hydroxyl number in the range from 3.0 mg KOH/g to 1000 mg KOH/g.

10. The process as claimed in claim 1, wherein said carboxylic acid comprises at least one compound corresponding to the formula RR'R"C—COOH, wherein R represents an optionally heteroatom-substituted hydroxyalkyl, hydroxyalkenyl, hydroxyaryl, carboxyalkyl, carboxyalkenyl or carboxyaryl radical or an OH, COOH, NH$_2$ or NHR'" group, wherein R'" represents an alkyl, alkenyl or aryl radical, and R' and R" each independently represent hydrogen or an optionally heteroatom-substituted alkyl, alkenyl, aryl, hydroxyalkyl, hydroxyalkenyl, hydroxyaryl, carboxyalkyl, carboxyalkenyl or carboxyaryl radical.

11. The process as claimed in claim 1, wherein said carboxylic acid comprises at least one of malonic acid, maleic acid, fumaric acid, succinic acid, oxalacetic acid, glutaric acid, adipic acid, pimelic acid, suberic acid, azelaic acid, sebacic acid, glycolic acid, lactic acid, tartronic acid, malic acid, tartaric acid, citric acid, isocitric acid, mandelic acid, gallic acid, γ-hydroxybutyric acid, γ-aminobutyric acid, ricinoleic acid, salicylic acid, hippuric acid, phthalic acid, isophthalic acid, terephthalic acid, shikimic acid, quinic acid, chorismic acid, gluconic acid, alanine, arginine, aspsin, aspartic acid, glutamine, glutamic acid, glycine, histidine, isoleucine, leucine, lysine, methionine, phenylalanine, proline, serine, threonine, tryptophan, tyrosine and valine.

12. The process as claimed in claim 1, wherein said alkylene oxide comprises at least one of ethylene oxide, propylene oxide, and styrene oxide.

13. The process as claimed in claim 1, wherein said double metal cyanide catalyst comprises at least one of zinc hexacyanocobaltate(III), zinc hexacyanoiridate(III), zinc hexacyanoferrate(III) and cobalt(II) hexacyanocobaltate (III).

14. The polyether carbonate polyols obtained by the process according to the invention as claimed in claim 1.

* * * * *